(12) United States Patent
Koehler

(10) Patent No.: US 9,410,325 B2
(45) Date of Patent: Aug. 9, 2016

(54) ADVANCED FRAME DESIGN FOR ROOF-INTEGRATED SOLAR PANELS

(71) Applicant: Integrated Solar Technology, LLC, Larchmont, NY (US)

(72) Inventor: Oliver Koehler, Larchmont, NY (US)

(73) Assignee: Integrated Solar Technology, LLC, Larchmont, NY (US)

( * ) Notice: Subject to any disclaimer, the term of this patent is extended or adjusted under 35 U.S.C. 154(b) by 0 days.

(21) Appl. No.: 14/270,584

(22) Filed: May 6, 2014

(65) Prior Publication Data

US 2015/0326172 A1    Nov. 12, 2015

(51) Int. Cl.
| | |
|---|---|
| *E04D 13/18* | (2014.01) |
| *E04D 13/10* | (2006.01) |
| *H02S 20/25* | (2014.01) |
| *E04D 13/17* | (2006.01) |
| *F24J 2/52* | (2006.01) |

(52) U.S. Cl.
CPC .............. *E04D 13/10* (2013.01); *E04D 13/17* (2013.01); *F24J 2/52* (2013.01); *F24J 2/5245* (2013.01); *H02S 20/25* (2014.12); *Y02E 10/47* (2013.01)

(58) Field of Classification Search
CPC ......... H02S 20/25; E04D 13/17; E04D 13/10; F24J 2/5245
USPC ........................................ 52/173.3; 136/246
See application file for complete search history.

(56) References Cited

U.S. PATENT DOCUMENTS

| | | | |
|---|---|---|---|
| 6,051,774 A * | 4/2000 | Yoshida et al. ................ 136/244 |
| 7,012,188 B2 | 3/2006 | Erling | |
| 7,661,422 B2 * | 2/2010 | Liu et al. ........................ 126/629 |
| 7,810,489 B2 * | 10/2010 | Liu et al. ........................ 126/569 |
| 8,215,070 B2 | 7/2012 | Railkar et al. | |
| 8,471,141 B2 * | 6/2013 | Stancel et al. ................. 136/246 |
| 8,782,967 B2 * | 7/2014 | Daniels ............................. 52/95 |
| 2005/0199278 A1 * | 9/2005 | Aschenbrenner ............. 136/251 |

(Continued)

FOREIGN PATENT DOCUMENTS

| | | |
|---|---|---|
| FR | 2958952 A1 * | 10/2011 |
| JP | 11229576 A * | 8/1999 .............. E04D 13/18 |

(Continued)

OTHER PUBLICATIONS

Co-pending U.S. Appl. No. 14/270,572, filed May 6, 2014, "Integrated Wire Management for Roof-Integrated Solar Panel," by Oliver Koehler, 44 pgs.

(Continued)

*Primary Examiner* — Adriana Figueroa

(74) *Attorney, Agent, or Firm* — Saile Ackerman LLC; Stephen B. Ackerman; Rosemary L. S. Pike

(57) ABSTRACT

The roof-integrated solar panel of the disclosure comprises a mounting frame having a top side for facing away from a roof, a bottom side for facing toward the roof, an upper side for facing an upslope direction, a lower side for facing a downslope direction, a left side and a right side, a solar panel mounted within the mounting frame, and a plurality of nose vents in the lower side of the mounting frame, a plurality of flow-through vents in the upper side of the mounting frame, and a plurality of exhaust vents in the top side of the mounting frame at an upper edge of the upper side wherein air is drawn up through the nose vents and out through the exhaust vents to cool the solar panel.

26 Claims, 15 Drawing Sheets

(56) References Cited

U.S. PATENT DOCUMENTS

| | | |
|---|---|---|
| 2005/0263181 A1* | 12/2005 | Yen ................................ 136/251 |
| 2009/0107490 A1* | 4/2009 | Liu et al. ........................ 126/704 |
| 2009/0133687 A1* | 5/2009 | Liu et al. ........................ 126/664 |
| 2010/0313499 A1 | 12/2010 | Gangemi |
| 2010/0313928 A1 | 12/2010 | Rose et al. |
| 2011/0088753 A1* | 4/2011 | Ahlgren et al. ............... 136/246 |
| 2011/0138710 A1 | 6/2011 | Reisdorf et al. |
| 2013/0167908 A1* | 7/2013 | Yang et al. .................... 136/251 |
| 2013/0255167 A1* | 10/2013 | Concho et al. .................... 52/84 |
| 2013/0255755 A1 | 10/2013 | Chich |
| 2013/0291456 A1 | 11/2013 | Desloover |
| 2014/0260001 A1* | 9/2014 | Kiik et al. .................... 52/173.3 |

FOREIGN PATENT DOCUMENTS

| | | |
|---|---|---|
| WO | WO 2010 047577 | 4/2010 |
| WO | WO 2012 151700 | 11/2012 |

OTHER PUBLICATIONS

"Sun Energy Shingle Installation Manual," Jan. 1, 2010, p. 9.

"The hardworking Solar Shingle that protects your home and powers your life," Powerhouse Solar, by Dow, Oct. 2011, 4 pgs., dowpowerhouse.com.

* cited by examiner

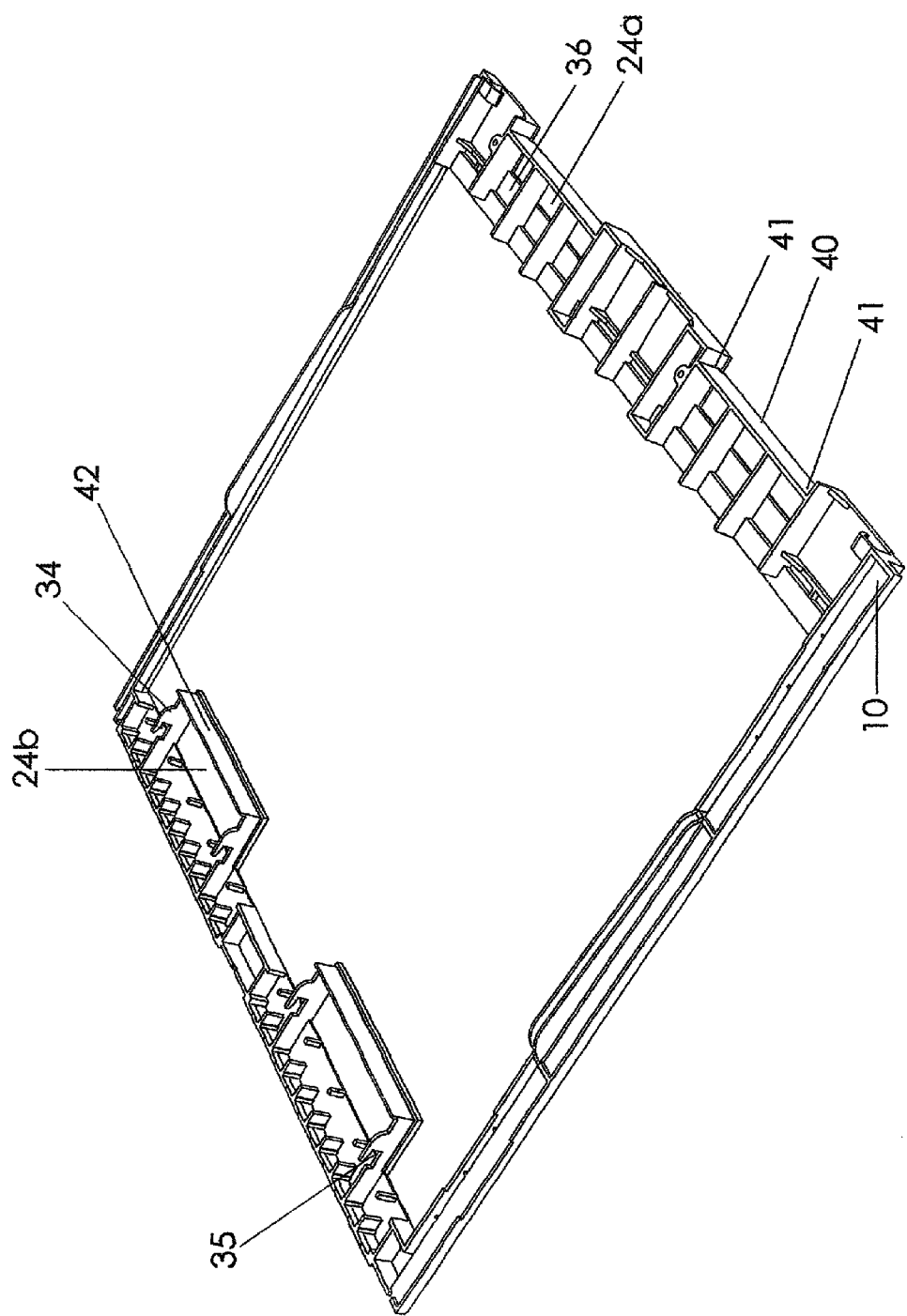

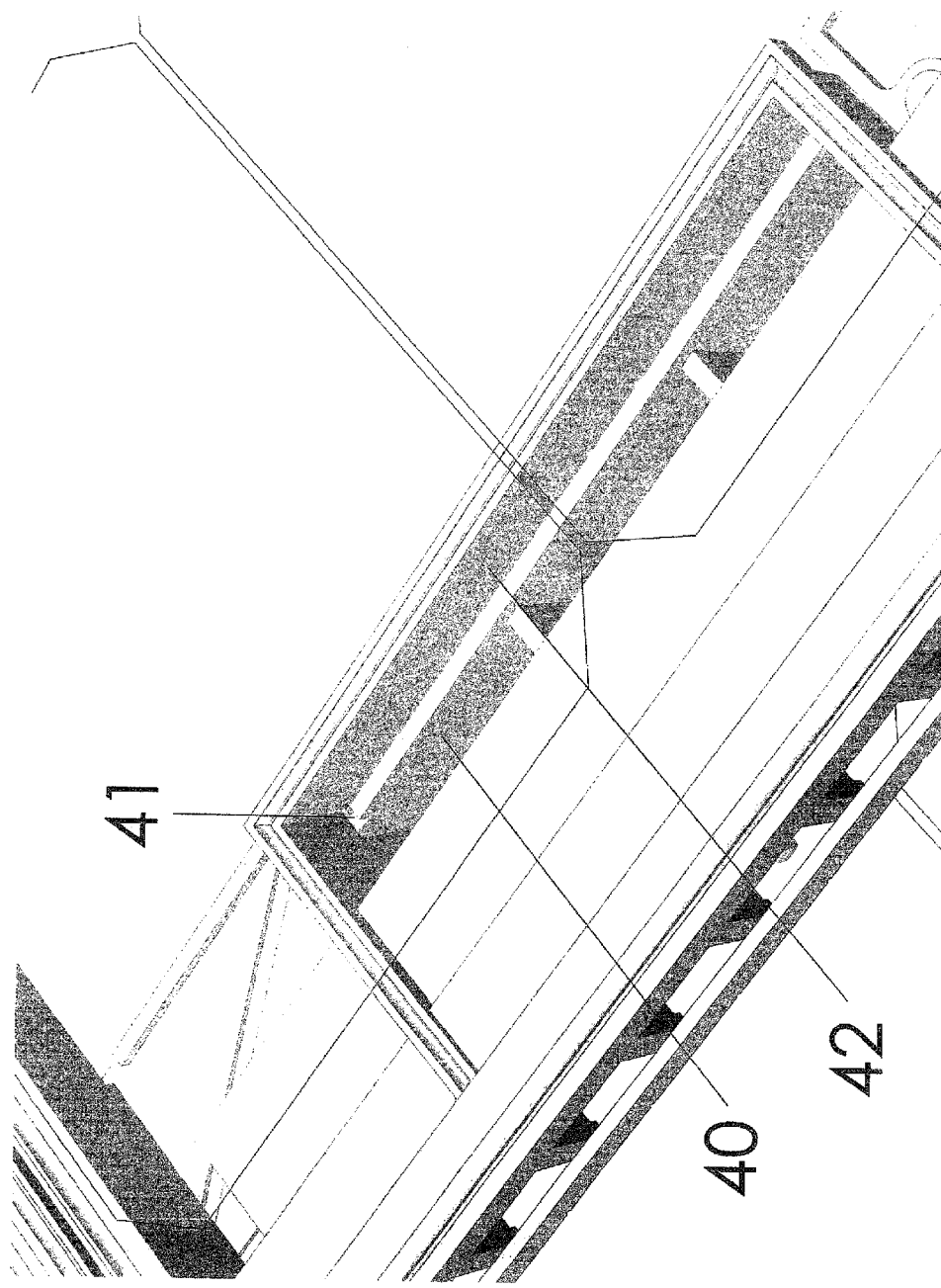

ADVANCED FRAME DESIGN FOR ROOF-INTEGRATED SOLAR PANELS

RELATED PATENT APPLICATION

This application is related to Ser. No. 14/270,572, filed on May 6, 2014, titled "Integrated Wire Management for Roof-Integrated Solar Panel", assigned to a common assignee, and herein incorporated by reference in its entirety.

TECHNICAL FIELD

This disclosure is related to solar panels, and more particularly, to methods of integrating solar panels with standard roof construction methods and roofing materials.

BACKGROUND

Roof-integrated solar panels, also called Building Integrated Photovoltaics (BIPV), are attached directly to a roof's decking or battens whereas conventional solar panels are typically mounted on rails which are approximately 5 inches above a roof. An array of conventional solar panels is naturally ventilated because there is sufficient space between them and the roof to allow air movement. However, a roof-integrated solar panel typically provides little to no ventilation underneath the panels if integrated into a tile roof and only a potential vent at the bottom and/or top of the array if integrated into an asphalt shingle roof. This causes the roof-integrated panels to operate at a higher temperature than conventional rack-mounted systems, reducing energy performance—typically by about 5 percent or more. It also causes temperature anomalies within the array due to heat stacking at the top of the array which can cause mismatch losses within a string. Because a roof-integrated solar system has typically been more expensive than conventional rack-mounted solar panels, this performance loss is an added hurdle for commercialization of roof-integrated solar systems.

Another issue facing roof-integrated solar systems is that because they are installed in an overlapping manner, it is difficult to mechanically fasten them in order to secure them against high wind loads. To solve this issue, other roof-integrated solar panels have restricted their installations to low wind load areas, have used metal clips that are attached on-site to either the panels or to the roof-deck or battens, or have designed an interlocking mechanism into the frame. Each of these methods has disadvantages. The first restricts the available market and the second slows installation and requires many separate parts. A third method known in the market and seen, for example, in the Sun Energy Shingle™ Installation Manual Version 3.1, published by BIPV Inc. (www.bipvinc.com), features an interlocking system where an integrated hook slides underneath the back of the frame below it as it overlaps over the frame below it. This wind clip 100 is shown in FIG. 11. This method has disadvantages as the interlocking method conflicts with a path for wires which potentially can be pinched and because this method only works with an asphalt shingle system and not with a tile system where the alignment of the hook and receiving hole is problematic.

U.S. Pat. No. 7,012,188 (Erling) and U.S. Pat. No. 8,215,070 (Raikar et al), European Patent Applications WO 2010047577 (Beijer et al) and WO 2012151700 (Richardson), and U.S. Patent Applications 2013/0255755 (Chich), 2013/0291456 (Desloover), 2011/0138710 (Reisdorf et al), 2010/0313499 (Gangemi), and 2010/0313928 (Rose et al) disclose various roof-integrated solar panels for shingled or tile roofs.

Another issue facing roof-integrated solar panels is that when they use a polymer type framing material, the frame is typically designed with ribs that run behind the crystalline-type solar cells. This is done because the polymer-type material is not as strong or stiff as the aluminum materials used to frame standard solar panels. However, these ribs increase the risk that the solar cells will develop cracks and/or micro-cracks when the roof-integrated panel is impacted by a downward load from an installer walking on the panel or from snow or wind. This is because the cells will be pinched between the ribs and the glass of the solar panel as the glass is being deflected down causing areas of higher mechanical stress. The cracks and/or micro-cracks in the cells lead to permanently degraded performance and hot-spots in cells which in severe cases can pose an electrical fire hazard.

Another issue facing roof-integrated solar panels using a polymer type framing material is that the solar laminate is typically adhered to the frame. If this adhesion fails during the life of the roof-integrated solar panel, the laminate will slide out of the frame causing water and weather to get underneath the solar panels or, in an extreme windstorm, possibly resulting in the laminate's becoming disconnected from the system and falling off of the roof causing other damage.

Yet another issue facing solar systems constructed with either roof-integrated or standard panels is that they typically shed new-fallen snow very easily because they heat up in the sun, even under a layer of snow. If there is sufficient snowfall, this typically results in the snow coming down off the solar system all at once in late morning on the day following a snowfall. This can damage gutters, landscaping, furniture or other items on the side of a house or business directly below the solar array. In an extreme case, it can injure a person if they happen to be standing there. This is sometimes mitigated by putting snow rakes on the roof below the solar array, but is typically only done in high snow regions.

SUMMARY

It is the primary objective of the present disclosure to provide a roof-integrated solar panel having ventilation means integrated into it.

Another objective of the present disclosure is to provide a roof-integrated solar panel with integrated ventilation enabling overlapping rows of solar panels to interlock with the row of solar panels below them.

Yet another objective is to provide roof-integrated solar panels that are resistant to damage to the solar cells due to a downward load.

A further objective of the present disclosure is to provide roof-integrated solar panels which have a secondary mechanical method of securing the solar laminate in the event there is an adhesion failure between the laminate and the frame.

A still further objective is to provide a mechanical method of securing the solar laminate that also has the function of acting as a snow rake and slowing the snow shedding process from the solar array following a heavy snowfall.

In accordance with the objectives of the present disclosure, a roof-integrated solar panel with integrated ventilation is achieved. The roof-integrated solar panel comprises a mounting frame having a top side for facing away from a roof, a bottom side for facing toward the roof, an upper side for facing an upslope direction, a lower side for facing a downslope direction, a left side and a right side, a solar laminate mounted within the mounting frame, and a plurality of nose vents in the lower side of the mounting frame, a plurality of flow-through vents in the upper side of the mounting frame, and a plurality of exhaust vents in the top side of the mounting frame at an upper edge of the upper side wherein air is drawn up through the nose vents, flows under the solar panel and directly contacting the solar panel thereby cooling the solar panel, and out through the flow-through vents and through the exhaust vents.

Also in accordance with the objectives of the present disclosure, a roofing system is achieved for mounting onto a roof deck, wherein a plurality of roofing shingles or tiles are arranged in courses on the roof deck. At least one roof-integrated solar panel is installed on the roof deck in place of a roofing shingle or tile, the roof-integrated solar panel being configured to match or complement the surrounding roofing shingles or tiles. Each roof-integrated solar panel comprises a mounting frame having a top side for facing away from a roof, a bottom side for facing toward the roof, an upper side for facing an upslope direction, a lower side for facing a downslope direction, a left side and a right side, a solar panel mounted within the mounting frame, and a plurality of nose vents in the lower side of the mounting frame, a plurality of flow-through vents in the upper side of the mounting frame, and a plurality of exhaust vents in the top side of the mounting frame at an upper edge of the upper side wherein air is drawn up through the nose vents, flows under the solar panel and directly contacting the solar panel thereby cooling the solar panel, and out through the flow-through vents and through the exhaust vents.

Also in accordance with the objectives of the present disclosure, a roofing system is achieved for mounting onto a roof deck, wherein a plurality of roofing shingles or tiles are arranged in courses on the roof deck. A plurality of roof-integrated solar panels are installed on the roof deck in place of a plurality of roofing shingles or tile, the roof-integrated solar panels being configured to match or complement the surrounding roofing shingles or tiles. Each roof-integrated solar panel comprises a mounting frame having a top side for facing away from a roof, a bottom side for facing toward the roof, an upper side for facing an upslope direction, a lower side for facing a downslope direction, a left side and a right side, a solar panel mounted within the mounting frame, and a plurality of nose vents in the lower side of the mounting frame, a plurality of flow-through vents in the upper side of the mounting frame, and a plurality of exhaust vents in the top side of the mounting frame at an upper edge of the upper side wherein air is drawn up through the nose vents, flows under the solar panel and directly contacting the solar panel thereby cooling the solar panel, and out through the flow-through vents and through the exhaust vents. The roof-integrated solar panels are laid out in at least two courses wherein an upper course overlaps a lower course overlying the exhaust vents of the lower course and wherein hot air is exhausted through the horizontal vents of a lower course and into the vertical vents of the overlapping upper course, thereby cooling the solar panels.

BRIEF DESCRIPTION OF THE DRAWINGS

In the accompanying drawings forming a material part of this description, there is shown:

FIG. 7A is a bottom view of a single frame in the first preferred embodiment of the present disclosure.

FIG. 7B is an enlarged top view of a combined upper and lower frame in the first preferred embodiment of the present disclosure.

DETAILED DESCRIPTION

Figure 1:
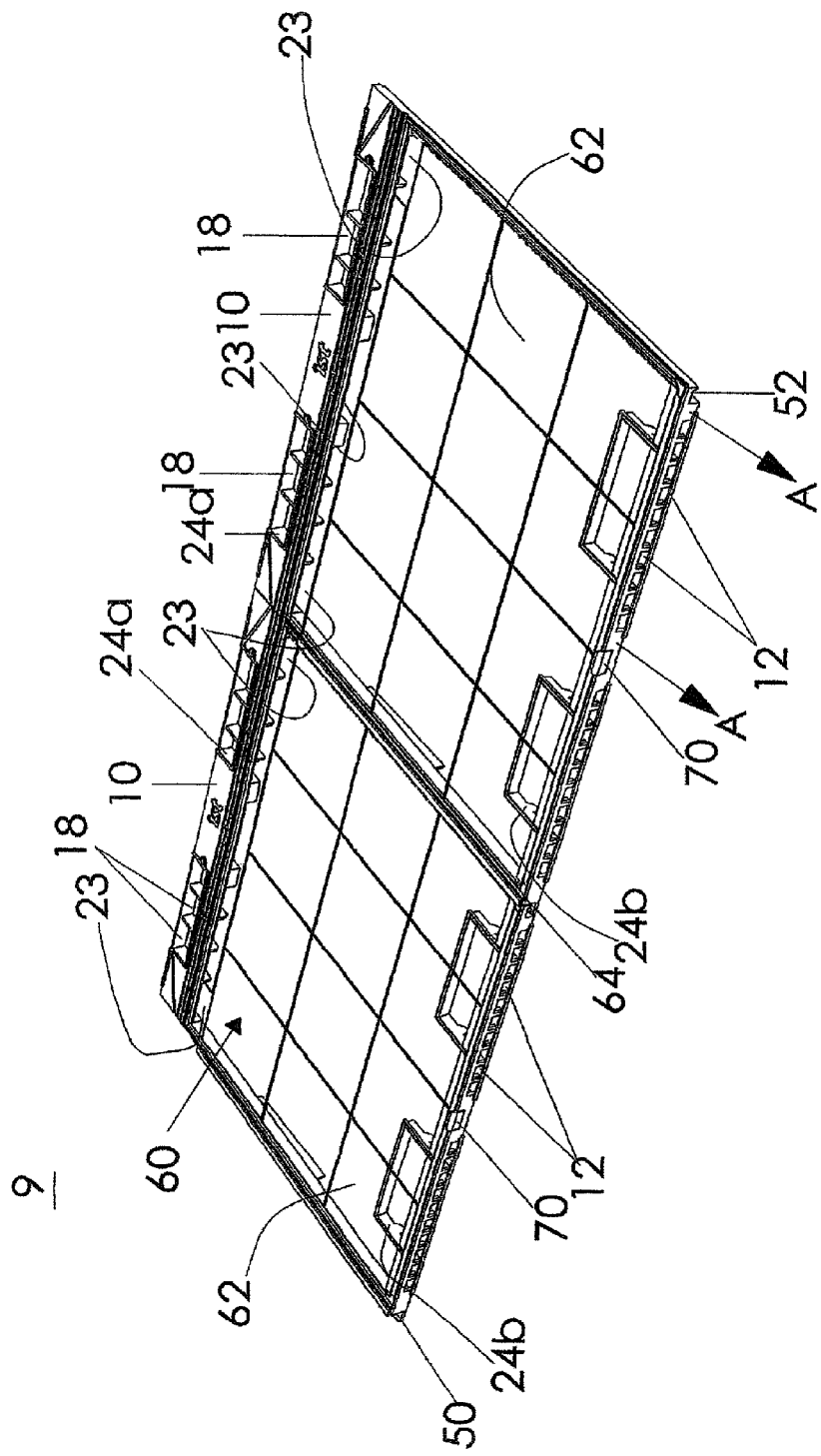
FIG. 1 is a top view of roof-integrated solar panel assembly of a first preferred embodiment of the present disclosure for a shingled roof.

The present disclosure is a roof-integrated solar panel with integrated ventilation. The roof-integrated solar panels are designed to enable overlapping rows of solar panels to interlock with the row of solar panels below them. The frame assembly of this disclosure is resistant to damage to the solar cells due to a downward load. Furthermore, the frame assembly also has a secondary mechanical method of securing the solar laminate in the event there is an adhesion failure between the laminate and the frame. The mechanical securing method also has the function of acting as a snow rake and slowing the snow shedding process from the solar array following a heavy snowfall.

Two main types of roofing materials in the United States are shingles and tiles. Asphalt shingles are used on perhaps 80-85% of roofs. Concrete, ceramic, or other material tiles are used on the remainder of roofs, significantly in the southwestern U.S. due to better cooling capability and durability. Shingle-based solar panels would be attached to the roof decking over a layer or layers of roof underlayment, while tile-based panels would typically be mounted either directly to the decking over a layer or layers of underlayment or onto standard wooden battens or elevated battens depending on the preference of the builder/roofer or regional code requirements.

As mentioned above, ventilation is not a significant problem for solar panels mounted on rails above a roof, but it is a problem for roof-integrated solar panels. In this disclosure, ventilation is integrated into each roof-integrated solar panel which allows cool air to flow underneath the solar panel throughout the array as well as heat to flow out from underneath the solar panel throughout the array. This ventilation reduces operating temperatures of the panels and improves performance.

In order to enable ventilation for each solar panel, the integrated mounting system (IMS) or framing system has several features that will be described with reference to the drawing figures.

Figure 2:
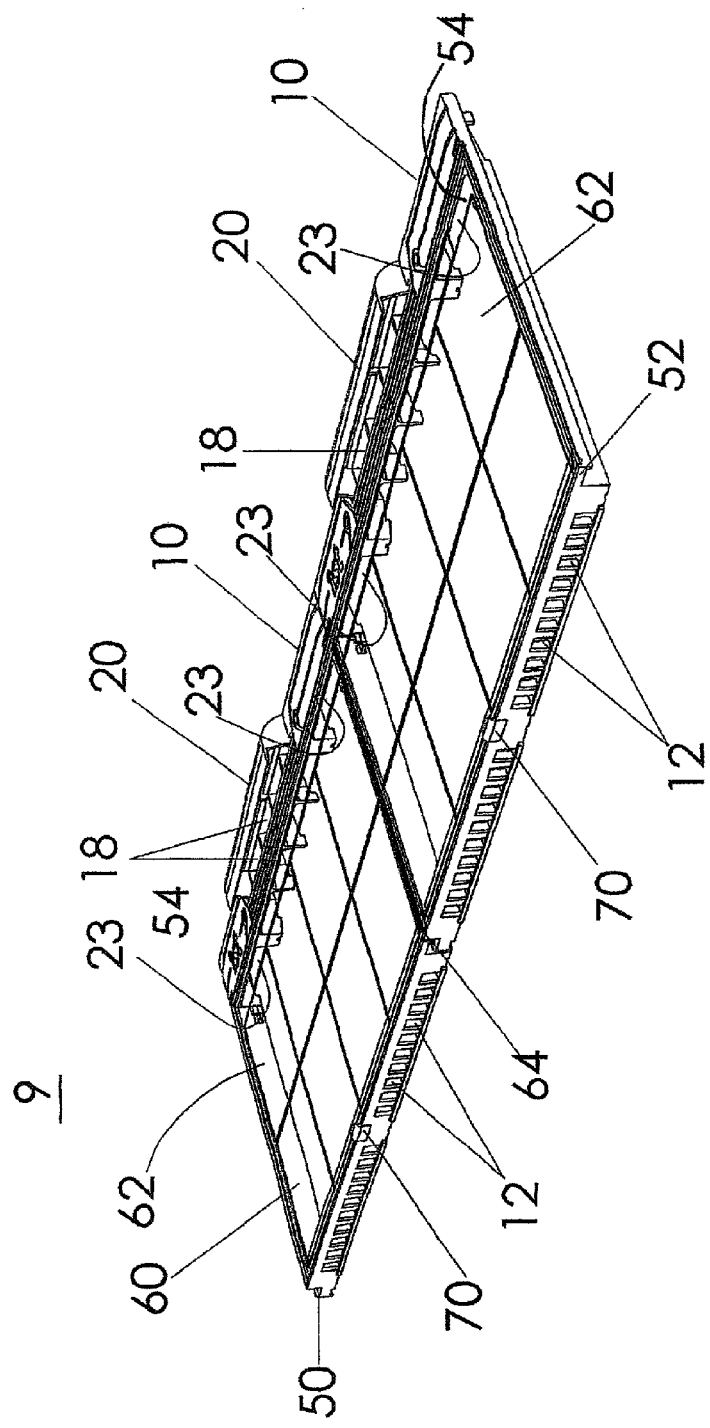
FIG. 2 is a top view of roof-integrated solar panel assembly of a second preferred embodiment of the present disclosure for a tile roof.

FIG. 1 is a top view of an assembly 9 of a roof-integrated solar panel to be used in a shingled roof. FIG. 2 is a top view of an assembly 9 of a roof-integrated solar panel to be used in a tile roof. The IMS material may be made from a polymer composite material, for example, that can be used for injection molding. Materials such as glass-filled Polyphenylene Ether plus Polystyrene (PPE+PE) or Polycarbonates can be used. The key requirements are that the material is conducive to injection molding processes and has good strength and stiffness, a wide thermal range, and fire retardant and UV stable properties. A laminate, or glass structure, 60 which has the solar cells 62 and wiring embedded within, is adhered to the frame assembly during module assembly. A frame assembly 9 consists of two frames 10 and one laminate 60.

Unlike typical roof-integrated solar panels, the disclosed IMS/frame is designed without ribs that run behind the crystalline-type solar cells. Ribs increase the risk that the solar cells will develop cracks and/or micro-cracks when the roof-integrated panel is impacted by a downward load from snow or wind or from an installer walking on the panel. As shown for example in FIGS. 1 and 2, it can be seen that no part of the frames 10 underlie the solar cells 62. In particular, there is support for the laminate 60 at the junction point of two frames 10, and overlying the junction point is an intentional gap 64 between solar cells 62. Because no part of the frame underlies the solar cells, downward pressure on the glass will not pinch the solar cells between the rib and the glass and therefore will not cause cracks to form in the solar cells.

Securing hook 70 is part of the frame, molded at the same time as the rest of the frame. It provides a secondary mechanical method of securing the solar laminate in the event there is an adhesion failure between the laminate and the frame. In addition, the securing hook 70 acts as a snow rake to slow the snow shedding process from the solar array following a heavy snowfall. If there is sufficient snowfall, this typically results in the snow coming down off the solar system all at once in late morning on the day following a snowfall. This can damage gutters, landscaping, furniture or other items on the side of a house or business directly below the solar array. In an extreme case, it can injure a person if they happen to be standing there. Though relatively small, it is believed the securing hooks 70 will be enough to slow down and break up sliding snow so that the risk of this type of damage is reduced.

Figure 3:
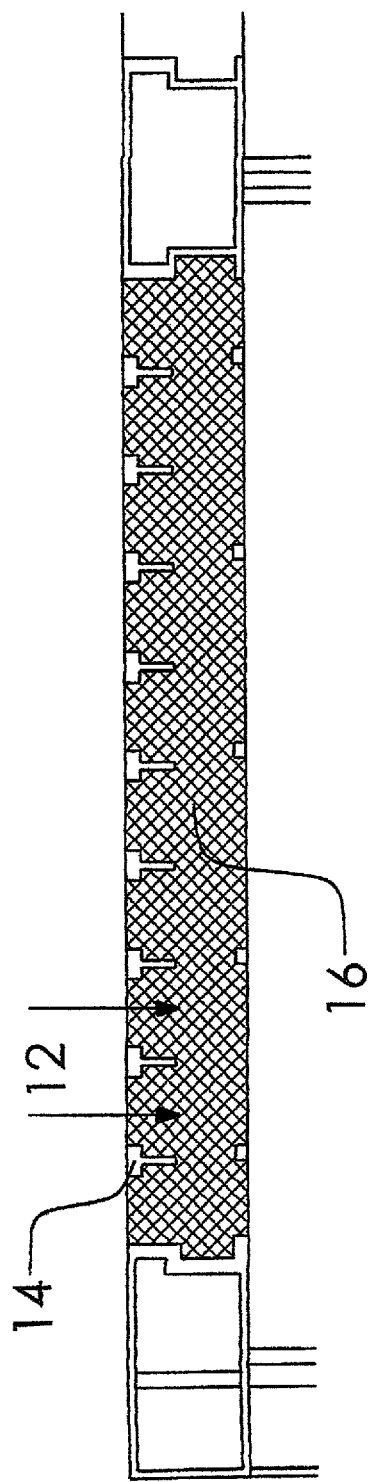
FIG. 3 is an enlarged sectional top view across view A-A of FIGS. 1 and 2.

Referring again to FIGS. 1 and 2, nose vents 12 are located at the front or nose of the solar panel. The front side will also be a lower side facing the downslope direction when installed on a roof. Nose vents consist of several shafts 12 separated by walls 14 and filled with a webbing material 16. FIG. 3 is an enlarged view across view A-A of FIGS. 1 and 2. These vents are similar in both the shingled roof embodiment and in the tile roof embodiment; they vary only in their height difference and the thickness of the webbing inserts between the two embodiments. The webbing material 16 is a woven mesh of polymeric material and can be the same material that is commonly used in ridge vents for asphalt shingle and metal roofs. This material stops weather, debris, and insects that might otherwise enter under the solar cell area while still allowing airflow into and out of this area.

Flow-through vents 23 are located in the upper side of the frame in the upslope direction. Nose vents 12 take in outside air which flows underneath the solar cells 62, contacting the underside of the solar laminate, and thereby cooling the solar cells. The air continues to flow through vents 23 up toward the top of the roof. The air will flow through other frame assemblies above the current frame assembly, cooling the solar cells in the array.

Figure 9A:
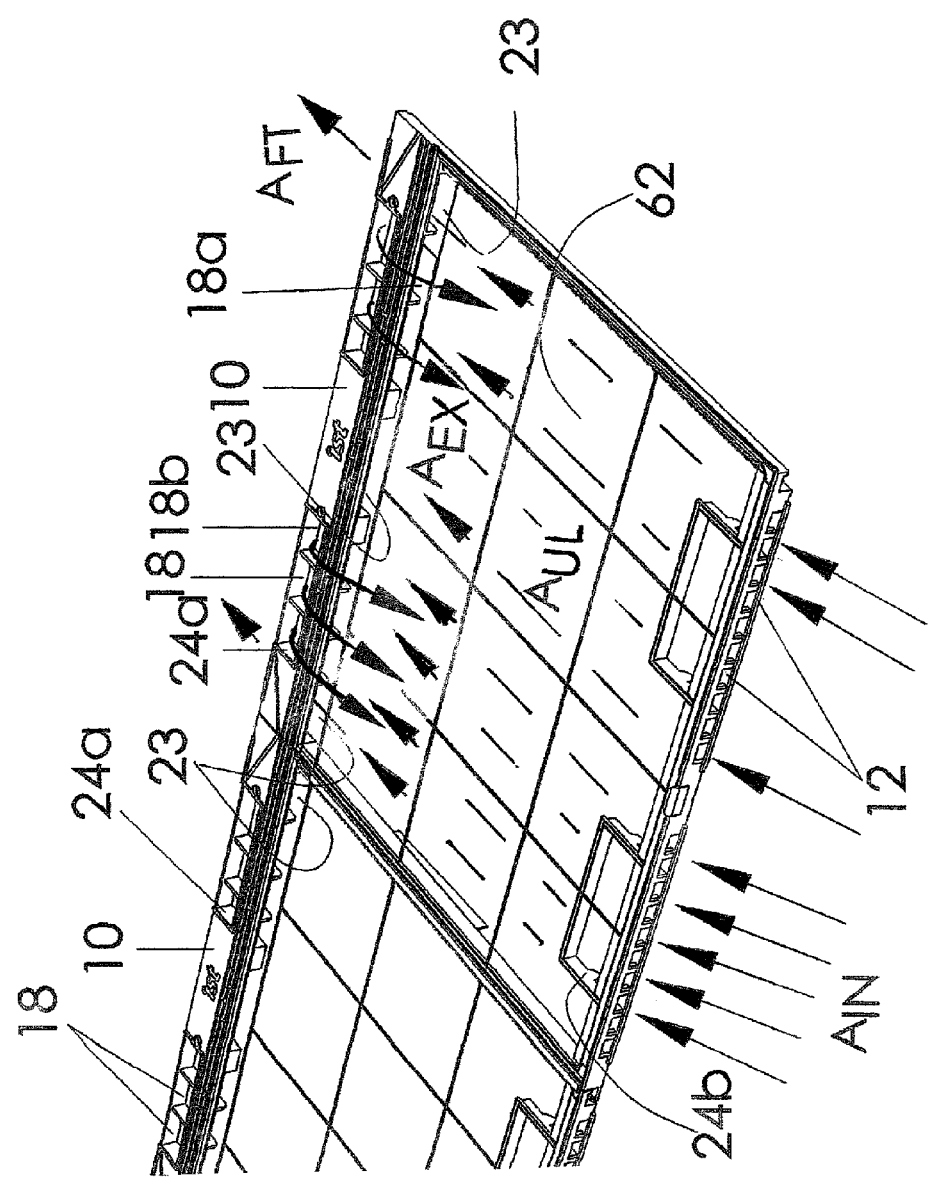
FIG. 9A is an enlarged view of a roof-integrated solar panel assembly showing airflow in the first preferred embodiment of the present disclosure.
Figure 9B:
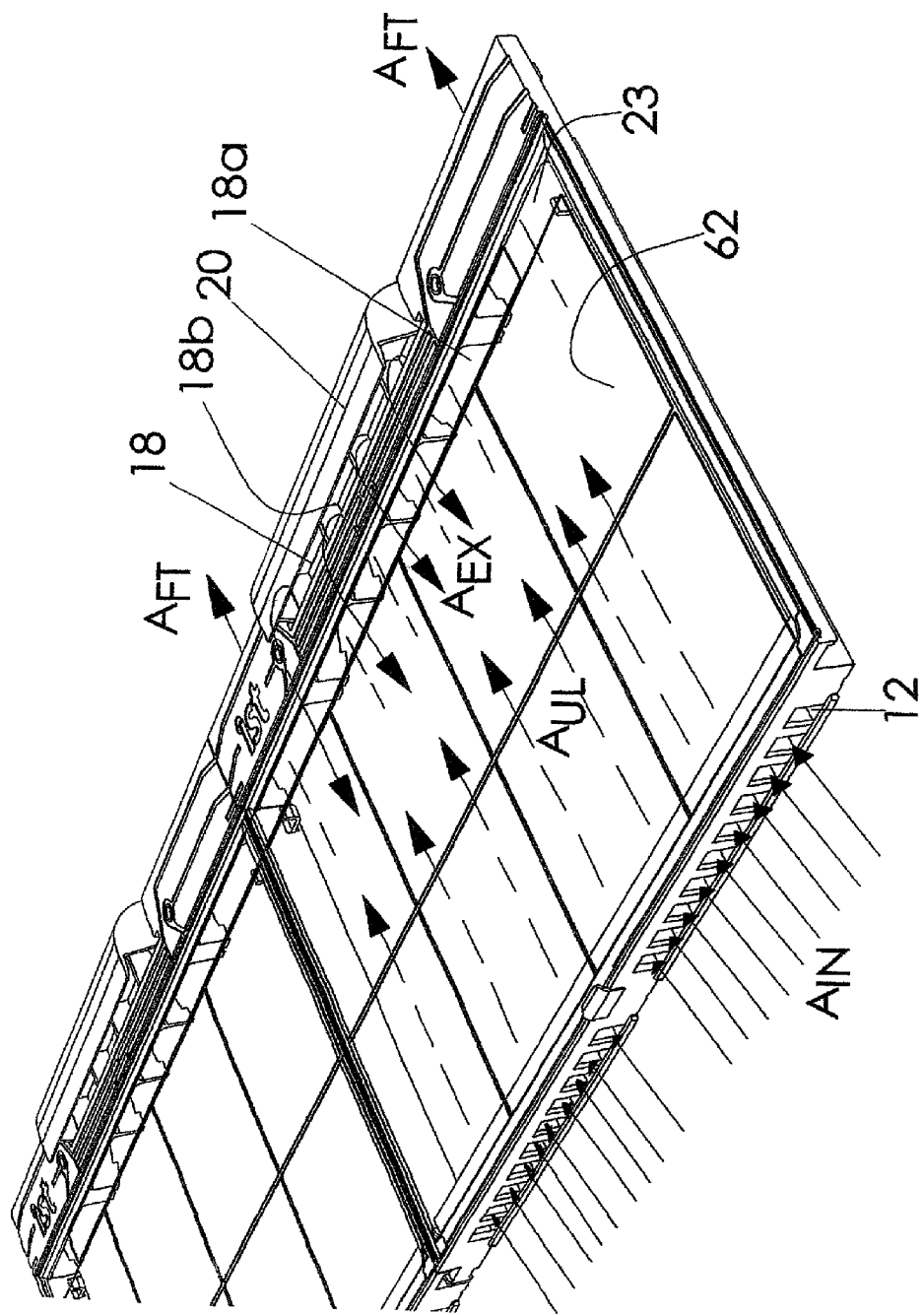
FIG. 9B is an enlarged view of a roof-integrated solar panel assembly showing airflow in the second preferred embodiment of the present disclosure.

Exhaust vents 18 are located at the top of each solar panel, on the top surface of the frame near the upper side of the frame facing the upslope direction of the roof. Refer to FIGS. 9A and 9B for a detailed explanation of the air flow through the exhaust vents 18. FIG. 9A illustrates a shingled roof embodiment while FIG. 9B illustrates a tile roof embodiment. The exhaust vents 18 can be considered to be made up of several parts: (i) a lower section 18a closest to the roof into which heated air flows along the roof, (ii) openings 18b in the upper surface of the frame through which the air flows vertically away from the roof, (iii) receiving hood 24b (FIG. 9A) which is part of an overlying frame or hood 20 (FIG. 9B) which is part of the underlying frame. Air enters the hood 24b or 20 vertically and exits horizontally. Finally, (iv) nose vents 12 of the overlying panel through which heated air escapes to the outside.

Hoods or ducts enable hot air to exhaust from the exhaust vents to the nose vents of an overlapping panel. There may be three to twenty vents in each frame, for example. FIG. 1 shows twenty nose vents 12, six exhaust vents 18, and two flow-through vents 23 in each frame 10, but these numbers can be adjusted for optimum ventilation and support of the laminate and webbing material. Exhaust vents 18 at the top of the IMS are spread apart more to maximize airflow into the exhaust vent, while leaving enough space for cables to go out above the frame for module-to-module connection. The size of the exhaust vents must accommodate the side-to-side offset of alternating rows of tile as described below.

Figure 5A:
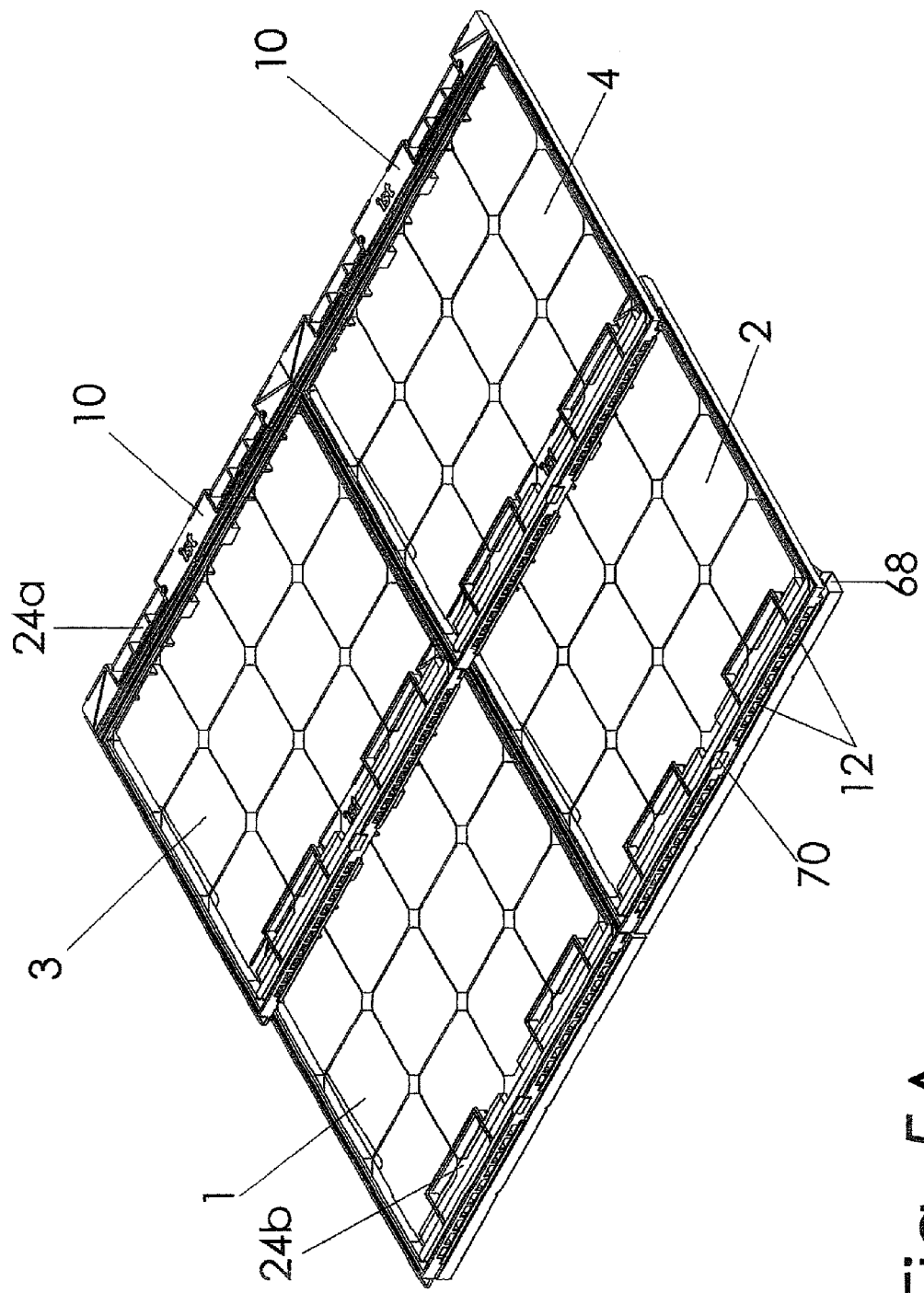
FIG. 5A is a top view of multiple roof-integrated solar panels of the first preferred embodiment of the present disclosure.
Figure 5B:
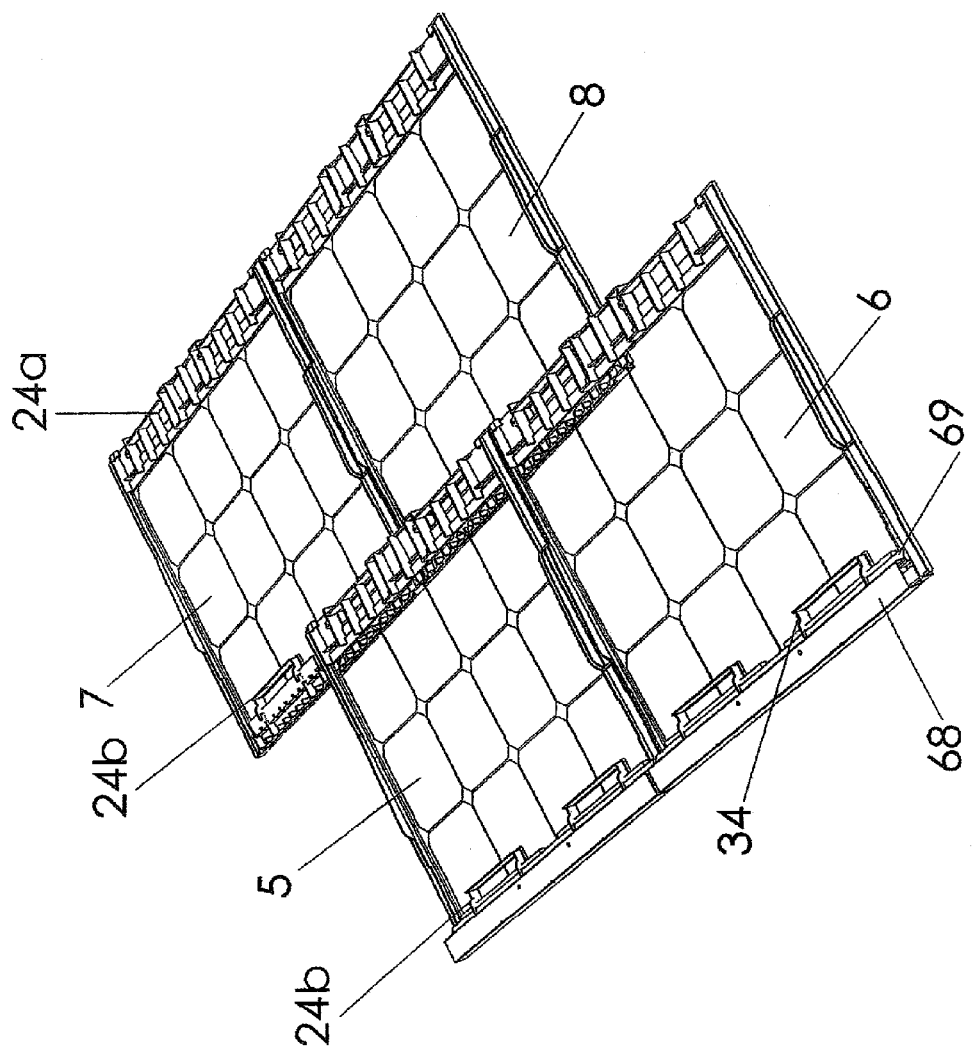
FIG. 5B is a bottom view of offset multiple roof-integrated solar panels of the first preferred embodiment of the present disclosure.

There are two hood or duct designs. The first type of hood or duct design is the integrated hood 24a/24b, as shown in FIG. 1, used in the shingled roof embodiment. This exhaust hood 24a and 24b is integrated into the modular IMS/frame piece 10 in two places. When one frame is laid over the other, a lower part 24a and upper part 24b join together to form an exhaust hood. In this integrated hood design the solar laminate acts as the roof of the exhaust duct or hood. The size and location of both parts of the integrated hood enable alternating rows to be positioned symmetrically or offset by half the distance of a modular IMS piece 10 and a quarter of the distance of the complete assembly. FIG. 5A shows a top view of panels 1-4 positioned symmetrically. FIG. 5B shows a bottom view of panels 5-6 offset from panels 7-8.

Figure 4:
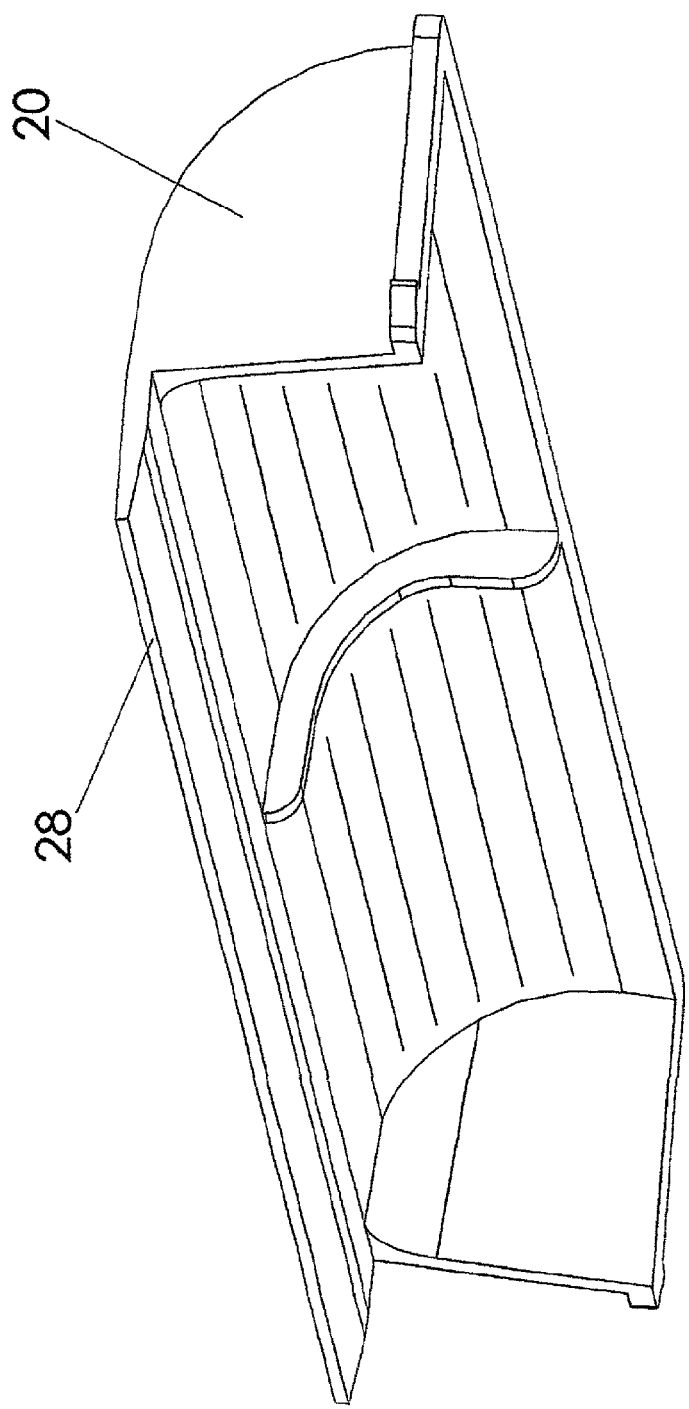
FIG. 4 is an isometric representation of a hood in the second preferred embodiment of the present disclosure.

FIG. 4 illustrates a separate hood 20, used only for tile roofs: This separate hood 20 can be attached or removed from a slot which is incorporated into the exhaust vent 18 of the IMS/frame, as shown in FIG. 2. The hood and channel are designed so that the hood locks into place once inserted. It can be removed by pressing in at the front ends of the hood and then pushing it out. The hood size and location is designed to enable an offset of 0 or up to 6 inches with the row of tile or solar panels above or below.

The roof-integrated solar panels of the present disclosure allow seamless integration with the top overlapping row of tile since the hood is separate and can be omitted on the top row of an array of the roof-integrated solar panels of the disclosure. This is necessary as the hood would interfere with the roof tiles' lying flat over the top row of roof-integrated solar panels. Additionally, the panels allow seamless integration with the typical tile offset between alternating rows when integrating with tile. FIG. 2 shows lips 50 and 52 on the side edges of the solar panel frame. These lips mate together to interlock two frames together. The lips also mate with standard roof tiles placed next to the solar panels to interlock the panel to the tile. The lower side of a roof-integrated solar panel will rest on an underlying solar panel or tile.

Figure 6A:
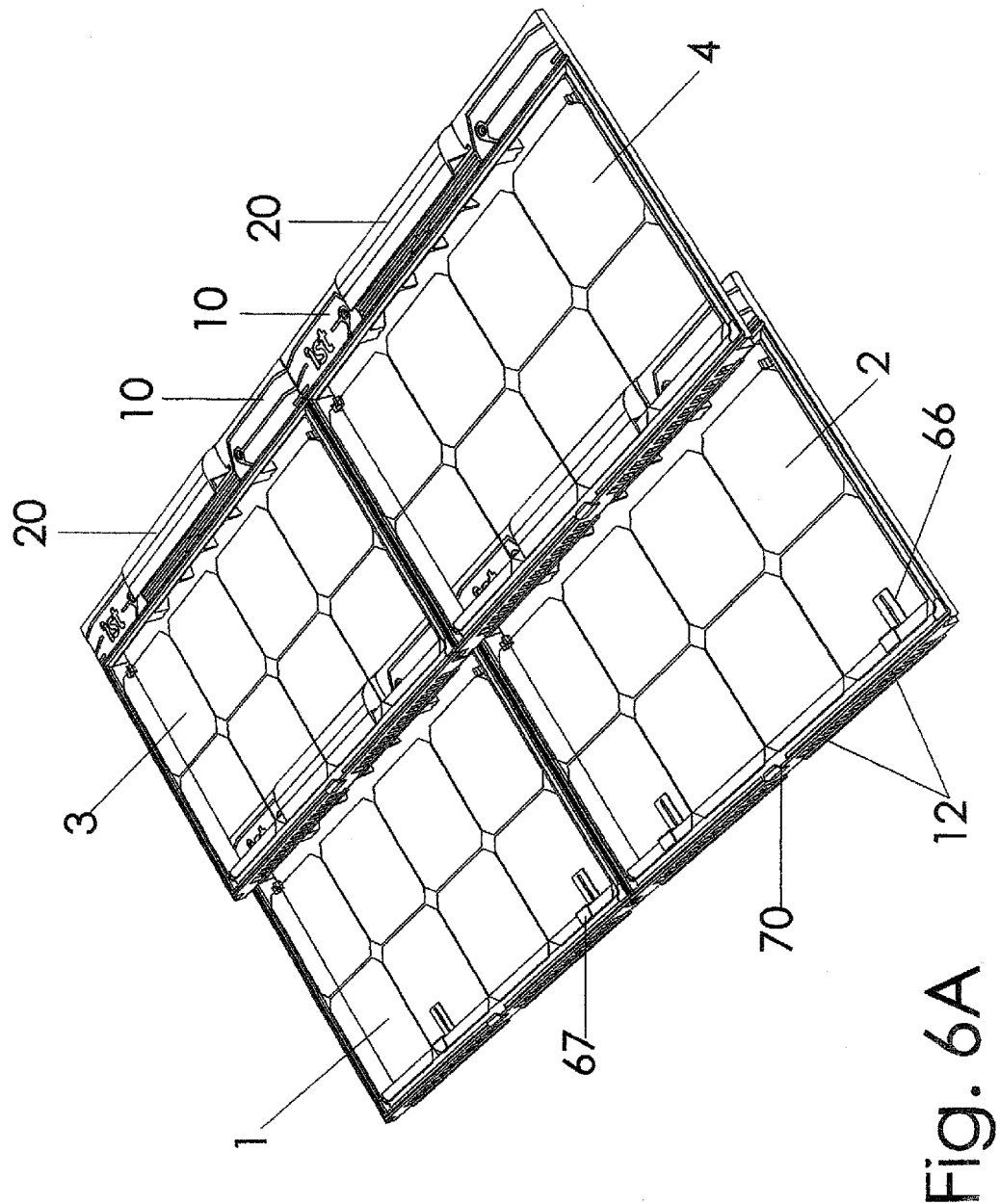
FIG. 6A is a top view of multiple roof-integrated solar panels of the second preferred embodiment of the present disclosure.
Figure 6B:
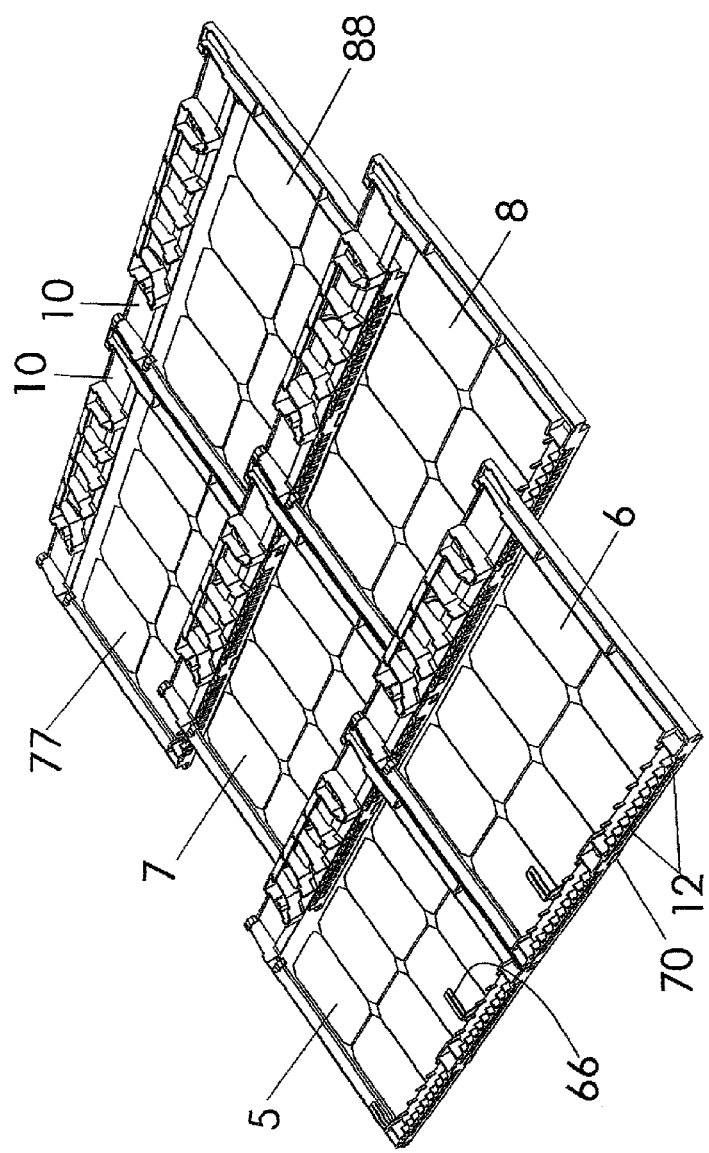
FIG. 6B is a bottom view of offset multiple roof-integrated solar panels of the second preferred embodiment of the present disclosure.

As shown in FIG. 2, there is a gap 54 between the top edge of a solar cell 62 and the area of the exhaust vents 18. This is to assure the overlapping of an upper course of solar panels on a lower course of solar panels will not overlap any portion of the solar cells to allow the solar cells to operate properly. FIG. 6A shows a top view of panels 1-4 positioned symmetrically. FIG. 6B shows a bottom view of panels 5-6 offset from panels 7-8. Panels 77-88 are offset from panels 7-8 by a different or similar offset amount in the opposite direction. Also shown in FIGS. 6A and 6B are starter clips 66. These starter clips 66 attach the lower side of the bottom row only of solar panel frames 10 (1 and 2 in the figures) to underlying tiles.

The integrated ventilation of the disclosure has the added feature of enabling an overlapping row to interlock with the row of solar panels below it. The two horizontal vent and hood designs have different interlocking mechanisms. FIG. 7A illustrates the back side of a frame showing panel interlocking in the case of the integrated hood for shingled roofs. The sidewalls of the upper half of the integrated exhaust hood 24b have hooks 34 that catch onto the shelf 36 in the front of the IMS/frame as the overlapping panel is slid forward into place over the roof-integrated panel below, so that the upper and lower exhaust vents line up and the hooks engage under the header of the lower row panel.

Also in this figure, it can be seen that the end wall 40 of the exhaust vents is moved inward from the top edge of the frame. This will force the air to be channeled skyward through the exhaust vents sooner. End wall 40 also has two grooves 41 at either end. Rear wall 42 of the exhaust vent 24b is extended down. FIG. 7B is an enlarged view of an exhaust vent 24a/24b. The grooves 41 enable the exhaust hood to slide down in the event the top glass receives downward pressure without hitting the end wall 40 of the lower exhaust vent 24a. This protects the solar cells above exhaust vent 24b from being pinched between the downward force of the glass and the exhaust vent 24a/24b. The longer rear wall 42 of exhaust vent 24b overlaps the end wall 40 in a way to accommodate movement and still prevent hot air from escaping out the top portion of the exhaust vent.

Figure 8:
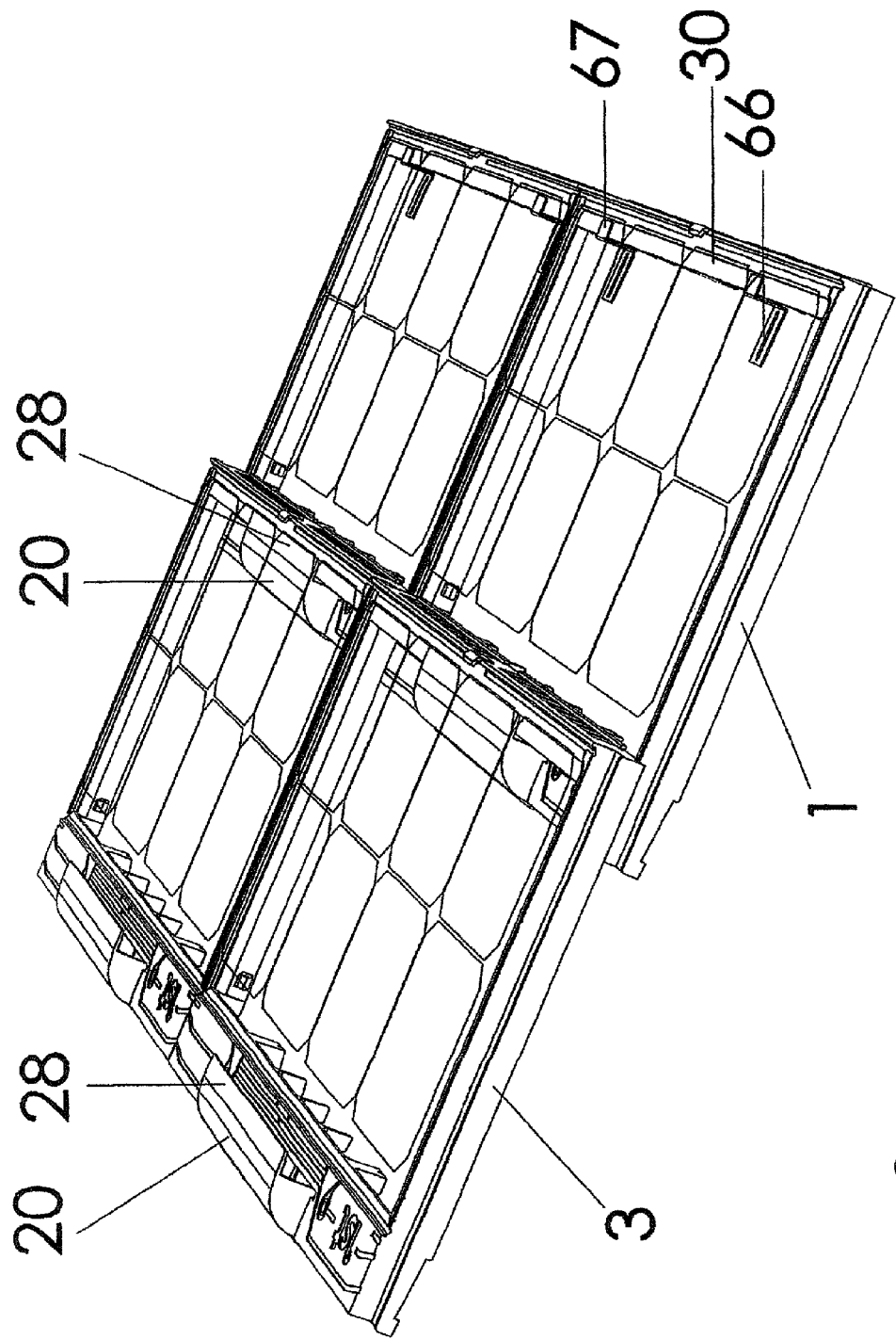
FIG. 8 is a side view of a overlapping frames in the second preferred embodiment of the present disclosure.

In tile roofs, the separate hood 20 has a front lip 28 which hooks onto a shelf 30 in the front of the IMS/frame of the solar panel which overlaps above it. See FIG. 4 for an enlarged view of the hood 20 showing lip 28. The shelf 30 is located between the bottom of the laminate and a top edge of frame 10. FIG. 8 illustrates a side view of panels 1 and 3. For a tile roof, upper panel 3 is laid down flat onto the surface of a lower panel 1 and then it is slid up until the upper panel sits on the batten, thereby engaging the front lip 28 of the hood of the lower row panel into shelf 30 of the upper panel 3. The front lip 28 is tapered to a sharp edge so that it will slide into the small gap between the laminate and the frame at shelf 30 to make a good seal between the rows of solar panels. The overlap of the lip 28 and the shelf 30 is also wide enough to accommodate variation in spacing of the battens or tiles of up to ½". As shown in FIGS. 6A and 6B, starter clips 66 attach the lower side of the bottom row only of solar panel frames 10 (1 and 2 in the figures) to underlying tiles.

The hoods, separate or integrated, direct the airflow. For a tile roof, the hood has to be removable, since it would not be used or needed on the final top row of an installation and may get in the way of a suitable interconnection with the first row of roof tiles above the solar panels. Additionally, alternating rows may have an offset up to 6 inches. The integrated hood requires an exact symmetrical or offset alignment which cannot be easily accommodated with standard tile roofing methods. A row of tiles above the top row of roof-integrated solar panels rests on top of the exhaust vents 18 with the separate hood removed. Since the airflow is from the bottom of the roof toward the top of the roof, heated air is exhausted out through the nose vents at each row under the overlapping solar panel. There is room beneath the overlapping tile over the top row of solar panels for heated air to be vented out under that tile.

On shingled roofs, there is an intermediary flashing that lies over the top of the top row of solar panels and then the asphalt shingle roofing material is laid over this flashing material. This allows the top flashing material to have some height above the top row of solar panels, enabling the top flashing to enable ventilation out of the top of the system. Webbing material will be placed into this flashing to keep weather, debris and insects out while enabling exhaust air to circulate out. For shingled roofs there is no direct offset constraint presented by the typical method of installing asphalt shingle roofing materials because an intermediary flashing is used on the left and right sides of the solar array and the asphalt roofing material can be trimmed to properly overlap this flashing material. Lips 50 and 52, shown in FIG. 1, interlock with the flashing on left and right sides of the solar array. FIGS. 5A and 5B show starter flashing 68 which is secured to the roof deck under the first row of roof-integrated solar panels. As seen in the bottom view in FIG. 5B, hooks 34 of exhaust vent 24b mate with a starter flashing flange 69 of starter flashing 68.

Refer again to FIGS. 9A and 9B illustrating the ventilation air flow for a shingled roof and tile roof, respectively. Please note that the dashed portions of the arrows in FIGS. 9A and 9B are intended to show airflow underneath the laminate or frame. Intake air $A_{IN}$ is shown entering nose vents 12. Air flows under the laminate as shown by $A_{UL}$. The air contacts the underside of the solar laminate 60 thereby cooling the solar cells 62. Some air $A_{FT}$ continues flowing along the roof and through the flow-through vents 23 to the space underneath the next higher panel. Other air $A_{EX}$ flows into exhaust vents 18a and vertically up through section 18b. This air exits to the outside through nose vents of the next higher panel, directed into the nose vents by hood 20 for a tile roof or receiving exhaust vents 24b for a shingled roof. Note that in the bottom row of panels of an installed array, nose vents 12 only take in outside air. In subsequent higher rows of panels, nose vents not situated directly above exhaust vents 18 also take in outside air, as some of the heated air moves up under successive panels. Further up the roof, the temperature and pressure differential between the heated air and the outside air will increase, which should lead to increased airflow out through the exhaust vents, which should subsequently pull more cool air in through the nose vents.

Figure 10:
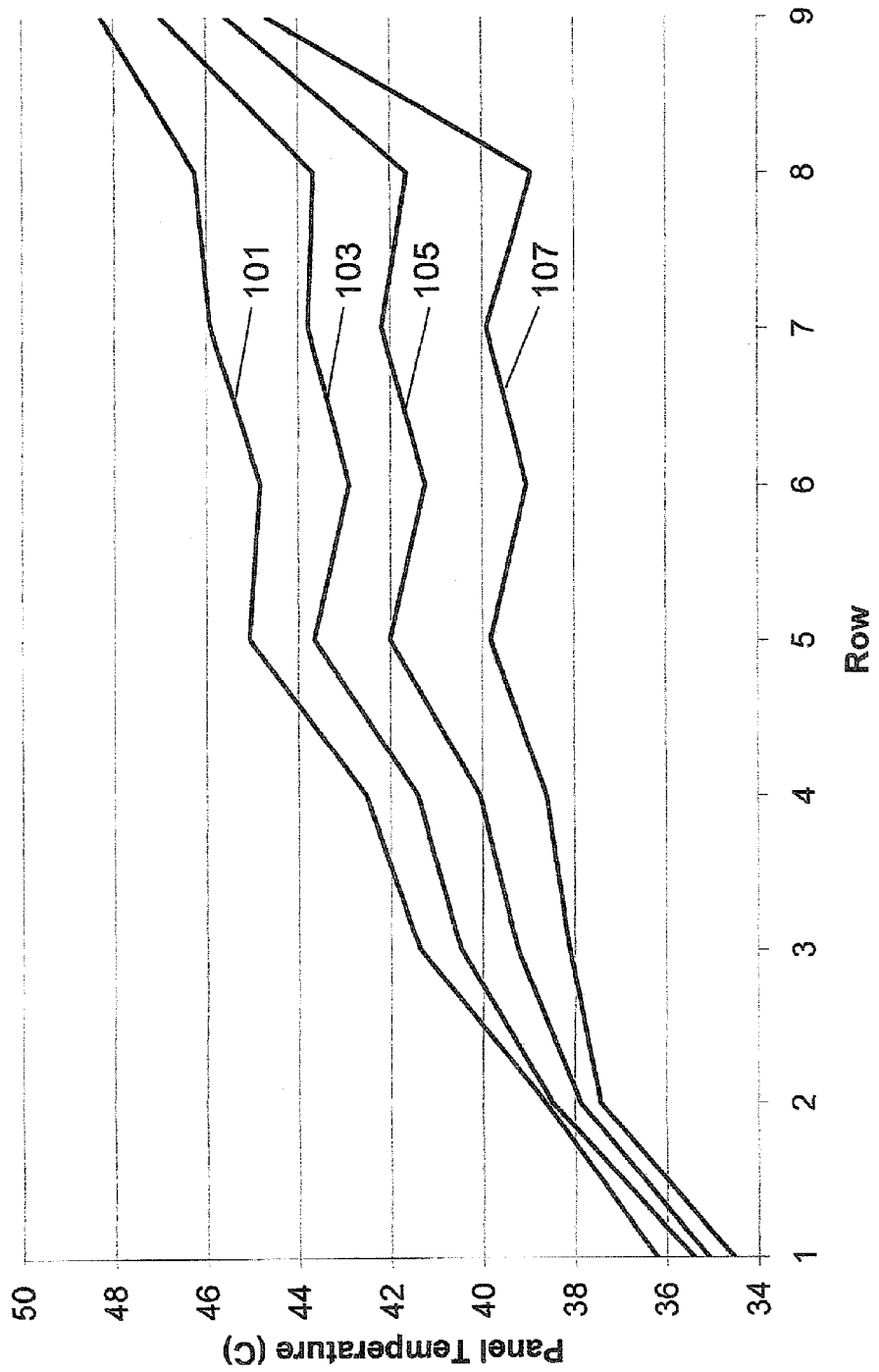
FIG. 10 is a graphical representation of the improvement seen in the present disclosure.
Figure 11:
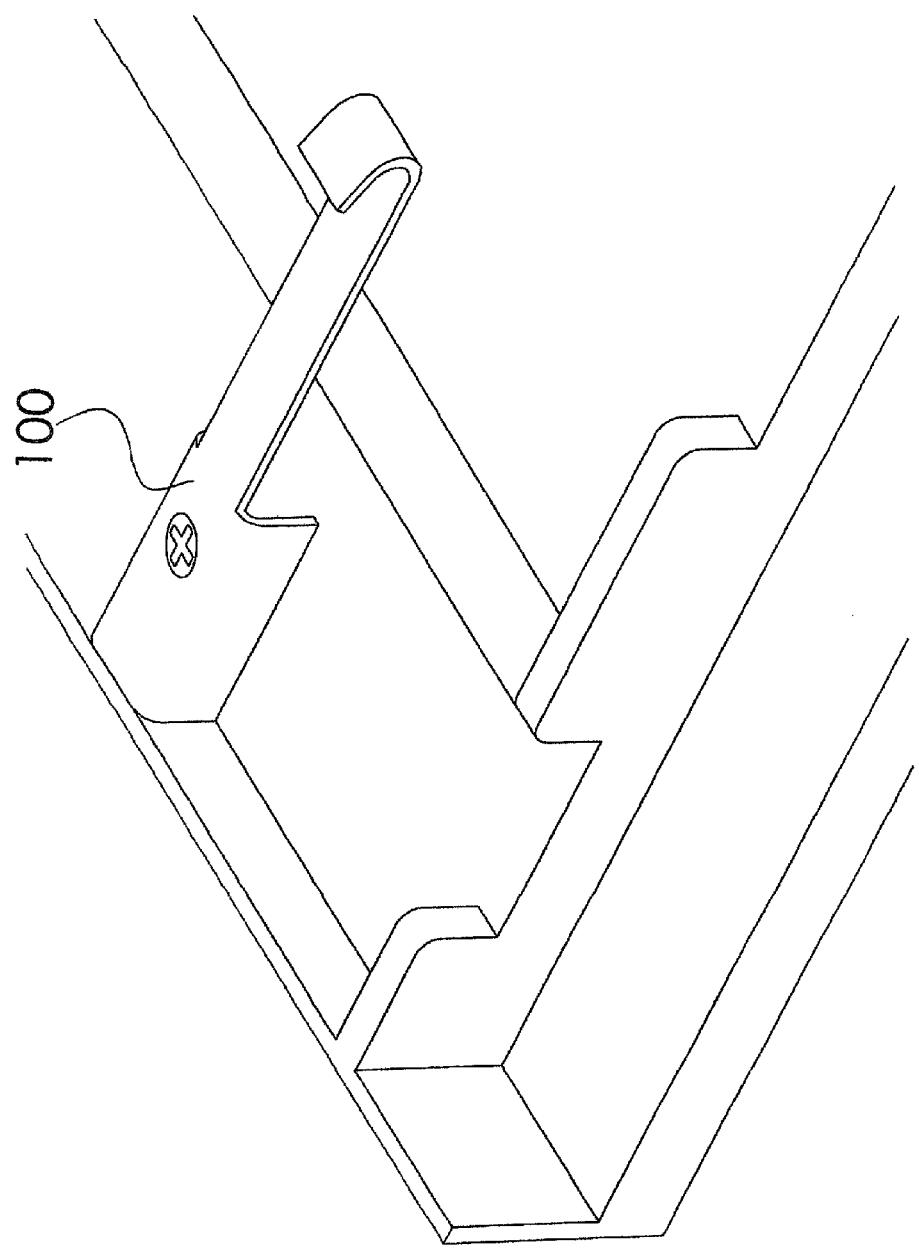
FIG. 11 is a bottom view of a solar panel of the prior art.

The integrated ventilation roof-integrated solar panel of the disclosure has been found to reduce operating temperatures for the roof-integrated solar panel of 1 to 5 degrees C. depending on ambient temperature, wind direction, and wind speed, and to improve performance 1 to 1.5% relative to roof-integrated solar panels that do not feature integrated ventilation. The integrated ventilation concept was developed through thermal modeling and was then empirically tested through field testing. FIG. 10 illustrates the results of a thermal modeling analysis for 9 roof-integrated solar tiles similar to those shown in FIG. 2 installed in a vertical column on a 30 degree sloping roof.

Four scenarios were modeled with varying ventilation at the lower or nose portion of each roof tile and a similar 50% exhaust ventilation at the top of the $9^{th}$ roof-integrated solar panel. The curves show the modeled temperature about one inch below each panel. The sample having curve 101 had nose vents in 5% of the lower edge of the frame and would be similar to roof-integrated solar panels without integrated ventilation. The sample having curve 105 had nose vents in 50% of the lower edge of the frame, which is similar to the design shown in FIG. 2. The simulation estimates that the panels with integrated ventilation operated between 3 to 4 degrees C. cooler than the panels with no ventilation, which correlates to about a 1.5%-2% performance difference based on a standard solar cell temperature coefficient of −0.5% power loss per degree Celsius.

These modeled results were supported by field data shown in Tables 1 and 2. These charts are based on data from two months of field data at a roof top site in Ft. Collins, Colo. where three solar panels similar to those in FIG. 2 were installed. At this site, tape was repeatedly put over the lower vertical vents for a period and then taken off for a period of time to simulate an array with and without integrated ventilation.

TABLE 1

| Configuration | Mean | Std Dev | Std Error Mean | Lower 95% | Upper 95% |
|---|---|---|---|---|---|
| Open Nose | 188.1 W | 3.93 W | 0.49 W | 187.1 W | 189.1 W |
| Closed Nose | 186.1 W | 3.67 W | 0.45 W | 185.2 W | 187.0 W |

Table 1 shows that the estimated PTC rated power, which is the standard measure for a solar panel's power under field conditions, was 2 watts or 1.1% higher for the solar panels when in open nose configuration.

TABLE 2

| Configuration | Solar Tile | East | North | South | West |
|---|---|---|---|---|---|
| Closed Nose | Top tile | 58.4 C. | 60.8 C. | 58.4 C. | 59.4 C. |
| Closed Nose | Center tile | 55.3 C. | 58.4 C. | 56.6 C. | 57.2 C. |
| Open Nose | Top tile | 57.5 C. | 60.5 C. | 53.9 C. | |
| Open Nose | Center tile | 55.6 C. | 58.7 C. | 53.2 C. | |

Furthermore, Table 2 shows that wind direction has a significant impact on panel temperature with wind from the north neutralizing the benefit of integrated ventilation and wind from the south enhancing the integrated ventilation's ability to cool the solar panels.

The IMS/frames 9 illustrated in FIGS. 1 and 2 differ in the number of exhaust vents per panel. In the drawings, the outside dimensions of the two frames have the same length and different widths, but this is not required. The vertical height of the two types of frames would typically be different. The height of the frame should be similar to the standard thickness of the roofing material to which the frame is being integrated. For example, a shingled version might be one half the height of a tile version. This is so that the roof-integrated solar panels will aesthetically fit in with the roofing material.

As shown in FIG. 1, each frame 10 of the shingle version has two areas of exhaust vents 18 while the tile version (FIG. 2) frame has one area of exhaust vents 18. The reason for this has to do with 1) integration of the solar panels with the surrounding roof structure, and, related to this, 2) how much each row can be offset from the row below it. The shingle version can be offset in increments of ¼ of an assembly width from one row to the next, as shown by panels 5, 6, 7, and 8 in FIGS. 5A and 5B. The benefit of having two hoods per frame in the shingle version is that the hooks 34 (in FIG. 7) across the lower edge can be more numerous and more broadly distributed, thereby providing wind resistance connection between one row and the next as well as between the first row panels and the starter flashing.

The two hood design also enables a ¼ offset for the finished assembly. The ¼ offset also provides flexibility in layout of the panels on the roof enabling a row to row offset of ¼, ½ and ¾ of a panel width. It can also enable ¼ width panels to be inserted within rows to even up the end of a row or to offset panels in alternating rows.

In contrast, in the tile versions, the flexible offset of 0 to 6 inches, in any increment, left or right between alternating rows of panels allows the tile solar panels to accommodate the roof tile off-set for each row of roof tiles which can vary from row to row or from roof to roof.

Interlocking of the panels through the separate or integrated hoods provides wind uplift protection for winds of 110 mph or higher for rows 2 and higher in an array. Further, this uplift protection is enabled without the need for additional parts or tools during installation and without any potential pinching of cables that are below the overlapping roof-integrated solar panel.

The interlocking of panels through separate or integrated hoods also provides a simple way for the first row of roof-integrated solar panels to be secured and protected from wind uplift. For the shingle version the hooks 34 (FIG. 5B) of the integrated hood will mate with a starter strip flange 69 of a starter strip 68 which is secured to the roof deck. For the tile version (FIG. 8) a separate starter clip 66 is secured to a plurality of roof tiles across the bottom of the solar array. The front lip 67 of these starter clips mates onto the shelf 30 of the first row of roof-integrated solar tiles.

The present disclosure provides roof-integrated solar panels with integrated ventilation wherein the solar panels are designed to enable overlapping rows of solar panels to interlock with the row of solar panels below them. The frame assembly of this disclosure is resistant to damage to the solar cells due to a downward load. Furthermore, the frame assembly also has a secondary mechanical method of securing the solar laminate in the event there is an adhesion failure between the laminate and the frame. The mechanical securing method also has the function of acting as a snow rake and slowing the snow shedding process from the solar array following a heavy snowfall.

Although the preferred embodiment of the present disclosure has been illustrated, and that form has been described in detail, it will be readily understood by those skilled in the art that various modifications may be made therein without departing from the spirit of the disclosure or from the scope of the appended claims.

What is claimed is:

1. A roofing system for mounting onto a roof deck, wherein a plurality of roofing shingles or tiles are arranged in courses on said roof deck, comprising:
    a plurality of roof-integrated solar panels installed on said roof deck in place of a plurality of roofing shingles or tile, the roof-integrated solar panels being configured to match or complement the surrounding roofing shingles or tiles, each comprising:
        a mounting frame having a top side for facing away from a structure, a bottom side for facing toward a structure, an upper side for facing the upslope direction, a lower side for facing a downslope direction, a left side and a right side;
        a photovoltaic solar panel mounted within said mounting frame; and
        a plurality of nose vents in said lower side of said mounting frame, a plurality of flow-through vents in said upper said of said mounting frame, and a plurality of exhaust vents in said top side of said mounting frame at an upper edge of said upper side wherein an exhaust hood is integrated into said frame over said exhaust vents to direct said air flow, wherein air is drawn up through said nose vents, flows under said photovoltaic solar panel and contacting said photovoltaic solar panel, and out through said flow-through vents and through said exhaust vents;

wherein said roof-integrated solar panels are laid out in at least two courses wherein an upper course overlaps a lower course wherein sidewalls of an upper exhaust hood at a lower edge of a frame on said upper course have hooks that catch onto a lower exhaust hood on the top side of a frame on said lower course, thereby interlocking together said roof-integrated solar panels, and wherein said air is exhausted through said exhaust vents of a lower course and out of said nose vents of said overlapping upper course, thereby cooling said photovoltaic solar panels.

2. The roofing system according to claim 1 wherein said nose vents consist of a plurality of shafts separated by walls and filled with a webbing material.

3. The roofing system according to claim 1 wherein for a first said lower course, said hooks mate with a starter strip flange of a starter strip which is secured to said roof deck.

4. The roofing system according to claim 1 wherein said upper course is mounted symmetrically with said lower course or offset from said lower course by increments of ¼ of a panel width.

5. The roofing system according to claim 1 wherein said upper and lower exhaust hoods mate in a flexible manner to protect solar cells from cracking and deter the escape of hot air between the two parts of the exhaust hoods.

6. The roofing system according to claim 1 wherein said photovoltaic solar panel comprises a plurality of photovoltaic solar cells and wiring in a laminate, mounted within two adjacent said mounting frames with an adhesive, wherein said mounting frames underlie said laminate at its edges and at its center and wherein no portion of said mounting frame underlies said photovoltaic solar cells.

7. The roofing system according to claim 6 wherein a gap between said photovoltaic solar cells is formed at said center of said laminate, over a joint that is formed between said two adjacent mounting frames.

8. The roofing system according to claim 1 further comprising a securing hook on said lower side of said mounting frame securing said photovoltaic solar panel to said mounting frame.

9. The roofing system according to claim 8 wherein said securing hook further acts to slow snow shedding from said roof-integrated solar panels.

10. A roofing system for mounting onto a roof deck, wherein a plurality of roofing shingles or tiles are arranged in courses on said roof deck, comprising:
a plurality of roof-integrated solar panels installed on said roof deck in place of a plurality of roofing shingles or tile, the roof-integrated solar panels being configured to match or complement the surrounding roofing shingles or tiles, each comprising:
a mounting frame having a top side for facing away from a structure, a bottom side for facing toward a structure, an upper side for facing the upslope direction, a lower side for facing a downslope direction, aloft side and aright side;
a photovoltaic solar panel mounted within said mounting frame; and
a plurality of nose vents in said lower side of said mounting frame, a plurality of flow-through vents in said upper said of said mounting frame, and a plurality of exhaust vents in said top side of said mounting frame at an upper edge of said upper side wherein an exhaust hood is removably attached to said frame into a slot which is incorporated into said exhaust vents wherein air is drawn up through said nose vents, flows under said photovoltaic solar panel and contacting said photovoltaic solar panel, and out through said flow-through vents and through said exhaust vents;

wherein said roof-integrated solar panels are laid out in at least two courses wherein an upper course overlaps a lower course wherein a front lip of said exhaust hood on a frame on said lower course hooks onto a shelf on a lower end of a frame on said overlapping upper course, thereby interlocking together said roof-integrated solar panels, and wherein said air is exhausted through said exhaust vents of a lower course and out of said nose vents of said overlapping upper course, thereby cooling said photovoltaic solar panels.

11. The roofing system according to claim 10 wherein said nose vents consist of a plurality of shafts separated by walls and filled with a webbing material.

12. The roofing system according to claim 10 wherein for a first said lower course, a plurality of starter clips are secured to a plurality of roof tiles across said lower side of said first lower course of solar panels wherein a front lip of said starter clips mates onto said shelf on said lower end of said frame of said first said lower course.

13. The roofing system according to claim 10 wherein said upper course is mounted offset from said lower course by any increment of 0-6" to left or right.

14. A roofing system for mounting onto a roof deck, wherein a plurality of roofing shingles or tiles are arranged in courses on said roof deck, comprising:
a plurality of roof-integrated solar panels installed on said roof deck in place of a plurality of roofing shingles or tile, the roof-integrated solar panels being configured to match or complement the surrounding roofing shingles or tiles, each comprising:
a mounting frame having a top side for facing away from a structure, a bottom side for facing toward a structure, an upper side for facing the upslope direction, a lower side for facing a downslope direction, a left side and a right side;
a photovoltaic solar panel mounted within said mounting frame, comprising a plurality of photovoltaic solar cells and wiring in a laminate, mounted within two adjacent said mounting frames with an adhesive, wherein said mounting frames underlie said laminate at its edges and at its center and wherein no portion of said mounting frame underlies said photovoltaic solar cells and wherein a gap between solar cells is formed at said center of said laminate, over a joint that is formed between said two adjacent mounting frames; and
a plurality of nose vents in said lower side of said mounting frame, a plurality of flow-through vents in said upper said of said mounting frame, and a plurality of exhaust vents in said top side of said mounting frame at an upper edge of said upper side wherein air is drawn up through said nose vents, flows under said photovoltaic solar panel and contacting said photovoltaic solar panel, and out through said flow-through vents and through said exhaust vents;

wherein said roof-integrated solar panels are laid out in at least two courses wherein an upper course overlaps a lower course and wherein said air is exhausted through said exhaust vents of a lower course and out of said nose vents of said overlapping upper course, thereby cooling said photovoltaic solar panels.

15. The roofing system according to claim 14 wherein said nose vents consist of a plurality of shafts separated by walls and filled with a webbing material.

16. The roofing system according to claim 14 further comprising a hood over said exhaust vents to direct said air flow.

17. The roofing system according to claim 16 wherein said hood is integrated into said frame over said exhaust vents.

18. The roofing system according to claim 16 wherein said hood is removably attached to said frame into a slot which is incorporated into said exhaust vents.

19. The roofing system according to claim 17 wherein sidewalls of an upper exhaust hood of said integrated hood at a lower edge of a frame on said upper course have hooks that catch onto a lower exhaust hood on the top side of a frame on said lower course, thereby interlocking together said roof-integrated solar panels.

20. The roofing system according to claim 18 wherein a front lip of said hood on a frame on said lower course hooks onto a shelf on a lower end of a frame on said overlapping upper course, thereby interlocking together said roof-integrated solar panels.

21. The roofing system according to claim 19 wherein for a first said lower course, said hooks mate with a starter strip flange of a starter strip which is secured to said roof deck.

22. The roofing system according to claim 20 wherein for a first said lower course, a plurality of starter clips are secured to a plurality of roof tiles across said lower side of said first lower course of solar panels wherein a front lip of said starter clips mates onto said shelf on said lower end of said frame of said first said lower course.

23. The roofing system according to claim 19 wherein said upper course is mounted symmetrically with said lower course or offset from said lower course by increments of ¼ of a panel width.

24. The roofing system according to claim 19 wherein said upper and lower exhaust hoods mate in a flexible manner to protect solar cells from cracking and deter the escape of hot air between the two parts of the exhaust hoods.

25. The roofing system according to claim 20 wherein said upper course is mounted offset from said lower course by any increment of 0-6" to left or right.

26. The roofing system according to claim 14 further comprising a securing hook on said lower side of said mounting frame securing said solar panel to said mounting frame, wherein said securing hook further acts to slow snow shedding from said roof-integrated solar panels.

* * * * *